United States Patent
Svacha et al.

(10) Patent No.: US 10,501,123 B2
(45) Date of Patent: Dec. 10, 2019

(54) VEHICLE CHASSIS ASSEMBLY

(71) Applicant: ArvinMeritor Technology, LLC, Troy, MI (US)

(72) Inventors: Kevin Svacha, Lake Orion, MI (US); Nimesh Meghpara, Troy, MI (US); Adam P. Sadlik, Clarkston, MI (US); Edward Brown, Shelby Township, MI (US); Paul Lawrence Barr, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 140 days.

(21) Appl. No.: 15/862,735

(22) Filed: Jan. 5, 2018

(65) Prior Publication Data

US 2019/0210651 A1 Jul. 11, 2019

(51) Int. Cl.
*B62D 21/09* (2006.01)
*B62D 21/11* (2006.01)
*B62D 21/02* (2006.01)
*B62D 33/077* (2006.01)
*B62D 33/06* (2006.01)

(52) U.S. Cl.
CPC ............ *B62D 21/09* (2013.01); *B62D 21/02* (2013.01); *B62D 21/11* (2013.01); *B62D 33/077* (2013.01); *B62D 33/06* (2013.01)

(58) Field of Classification Search
CPC ...... B62D 25/085; B62D 21/03; B62D 21/09; B62D 21/02; B62D 21/11; B62D 33/077; B62D 21/155; B60K 17/16
USPC .......... 296/187.07, 199, 193.09, 204, 203.03
See application file for complete search history.

(56) References Cited

U.S. PATENT DOCUMENTS

| 6,322,105 | B1 * | 11/2001 | Na .................... B62D 21/08 280/781 |
| 9,221,496 | B2 | 12/2015 | Barr et al. |
| 2003/0137163 | A1 * | 7/2003 | Hayashi .............. B62D 21/152 296/204 |
| 2007/0176389 | A1 | 8/2007 | VanBelle et al. |
| 2008/0054586 | A1 | 3/2008 | Lechkun |
| 2008/0258417 | A1 * | 10/2008 | Cordier .................... B60G 3/20 280/124.109 |

(Continued)

FOREIGN PATENT DOCUMENTS

| FR | 2972169 A1 * | 9/2012 | ............ B62D 21/02 |
| WO | 02085670 A2 | 10/2002 | |
| WO | 2008052180 A1 | 5/2008 | |

OTHER PUBLICATIONS

European Patent Office, Extended European Search Report for corresponding European Application No. 18213069.0-1013, dated Aug. 23, 2019.

(Continued)

*Primary Examiner* — Jason S Morrow
(74) *Attorney, Agent, or Firm* — Brooks Kushman P.C.

(57) ABSTRACT

A vehicle chassis assembly having first and second frame rails. The vehicle chassis assembly may have an outrigger subassembly that may support a cab of the vehicle and may be disposed on the first and second frame rails. The vehicle chassis assembly may have an axle assembly that may be fixedly mounted to a mounting plate that may be fixedly mounted to a subframe that may be fixedly disposed on the first and second frame rails.

20 Claims, 9 Drawing Sheets

(56) References Cited

U.S. PATENT DOCUMENTS

| | | | | |
|---|---|---|---|---|
| 2013/0241237 A1* | 9/2013 | Dziuba | ................. | B62D 21/11 |
| | | | | 296/193.04 |
| 2016/0047631 A1* | 2/2016 | Berman | ................. | F41H 7/042 |
| | | | | 296/187.07 |
| 2017/0349226 A1* | 12/2017 | Oren | ........................ | B60S 9/02 |

OTHER PUBLICATIONS

Australian Government/IP Australia, Examination Report No. 1 for Australian Application No. 2018282278, dated Sep. 5, 2019.

\* cited by examiner

VEHICLE CHASSIS ASSEMBLY

TECHNICAL FIELD

This disclosure relates to a chassis assembly for a vehicle, such as a land vehicle like a military truck.

BACKGROUND

A suspension module having a skid plate is disclosed in U.S. Pat. No. 9,221,496.

SUMMARY

In at least one embodiment, a vehicle chassis assembly is provided. The chassis assembly may include first and second frame rails and an outrigger subassembly. The outrigger subassembly may be disposed on the first and second frame rails and may be configured to support a cab of a vehicle. The outrigger subassembly may include a first outrigger, a linkage, and a downtube. The first outrigger may extend from the first frame rail in a direction that extends away from the second frame rail. The first outrigger may have a top side that may support the cab. The linkage may extend from an end of the first outrigger. The downtube may be coupled to the linkage.

In at least one embodiment, a vehicle chassis assembly is provided. The vehicle chassis assembly may include first and second frame rails, a subframe, a skid plate, a mounting plate, and an axle assembly. The subframe may be fixedly disposed on the first and second frame rails. The subframe may have first and second downward extending arms that may be disposed along a first lateral side of the subframe. The skid plate may be fixedly disposed on the first and second downward extending arms. The mounting plate may be fixedly mounted to the subframe and to the skid plate. The axle assembly may be fixedly mounted to the mounting plate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
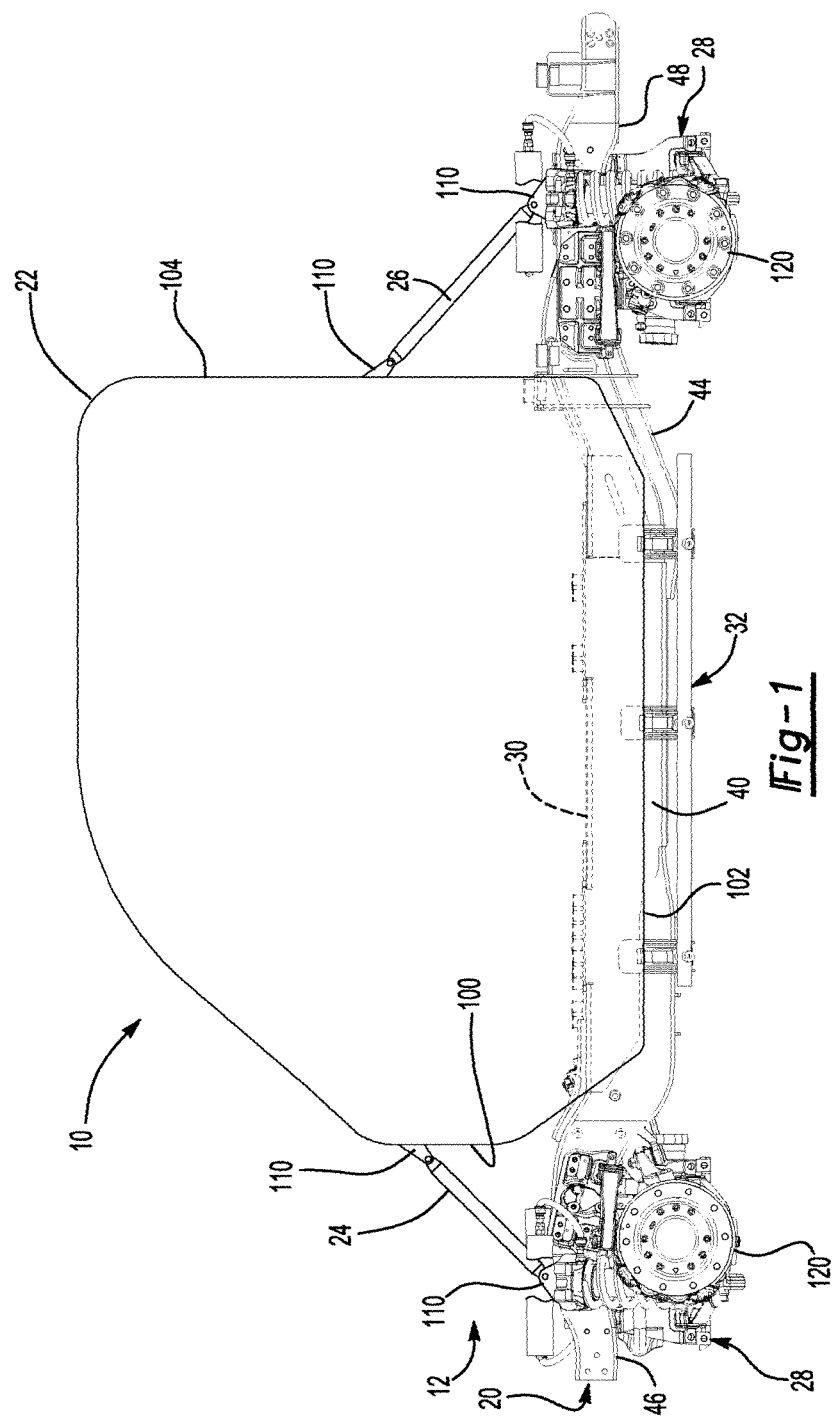
FIG. 1 is a side view of a vehicle chassis assembly.

Referring to FIG. 1, a portion of a vehicle 10 having a vehicle chassis assembly 12 is shown. The vehicle chassis assembly 12 may be provided with a motor vehicle like a truck, bus, farm equipment, or military or weaponry vehicle. The vehicle chassis assembly 12 may include a chassis 20, a cab 22, one or more front braces 24, one or more rear braces 26, and one or more axle mounting modules 28.

The chassis 20 may help provide the structure of the vehicle and may facilitate mounting of various components, such as the axle mounting modules 28 and the cab 22. In at least one configuration, the chassis 20 may include frame rails 30 and an outrigger subassembly 32.

The frame rails 30 may extend longitudinally or in a direction that may extend between the front and rear of the vehicle. In the configuration shown, two frame rails 30 are provided that may be spaced apart from each other and that may extend substantially parallel to each other. The frame rails 30 may have similar or identical configurations. For convenience in reference, one frame rail 30 may be referred to as a first frame rail and the other frame rail 30 may be referred to as a second frame rail. Each frame rail 30 may include a center portion 40, a first gooseneck portion 42, a second gooseneck portion 44, a first axle mounting portion 46, and a second axle mounting portion 48.

The center portion 40 may be disposed between the first gooseneck portion 42 and the second gooseneck portion 44. The center portion 40 may be disposed below the first axle mounting portion 46 and the second axle mounting portion 48. The center portion 40 may be provided with any suitable length to help provide a desired wheelbase or distance between the wheel axes of rotation between the front and rear axle assemblies.

The first gooseneck portion 42 may extend from a first end of the center portion 40. The first gooseneck portion 42 may extend upward from the center portion 40 and may extend from the center portion 40 to the first axle mounting portion 46.

The second gooseneck portion 44 may be disposed opposite the first gooseneck portion 42. As such, the second gooseneck portion 44 may extend from a second end of the center portion 40 that may be disposed opposite the first end. The second gooseneck portion 44 may extend upward from the center portion 40 and may extend from the center portion 40 to the second axle mounting portion 48.

The first axle mounting portion 46 may be disposed at a first distal end of the frame rail 30. The first axle mounting portion 46 may extend longitudinally from the first gooseneck portion 42 in a direction that extends away from the center portion 40. The first axle mounting portion 46 may facilitate mounting of an axle mounting module 28 and may facilitate mounting of a front brace 24 as will be discussed in more detail below.

The second axle mounting portion 48 may be disposed at an opposite end of the frame rail 30 from the first axle mounting portion 46. As such, the second axle mounting portion 48 may be disposed at a second distal end of the frame rail 30. The second axle mounting portion 48 may extend longitudinally from the second gooseneck portion 44 in a direction that extends away from the center portion 40. The second axle mounting portion 48 may facilitate mounting of another axle mounting module 28 and may facilitate mounting of a rear brace 26 as will be discussed in more detail below.

Figure 2:
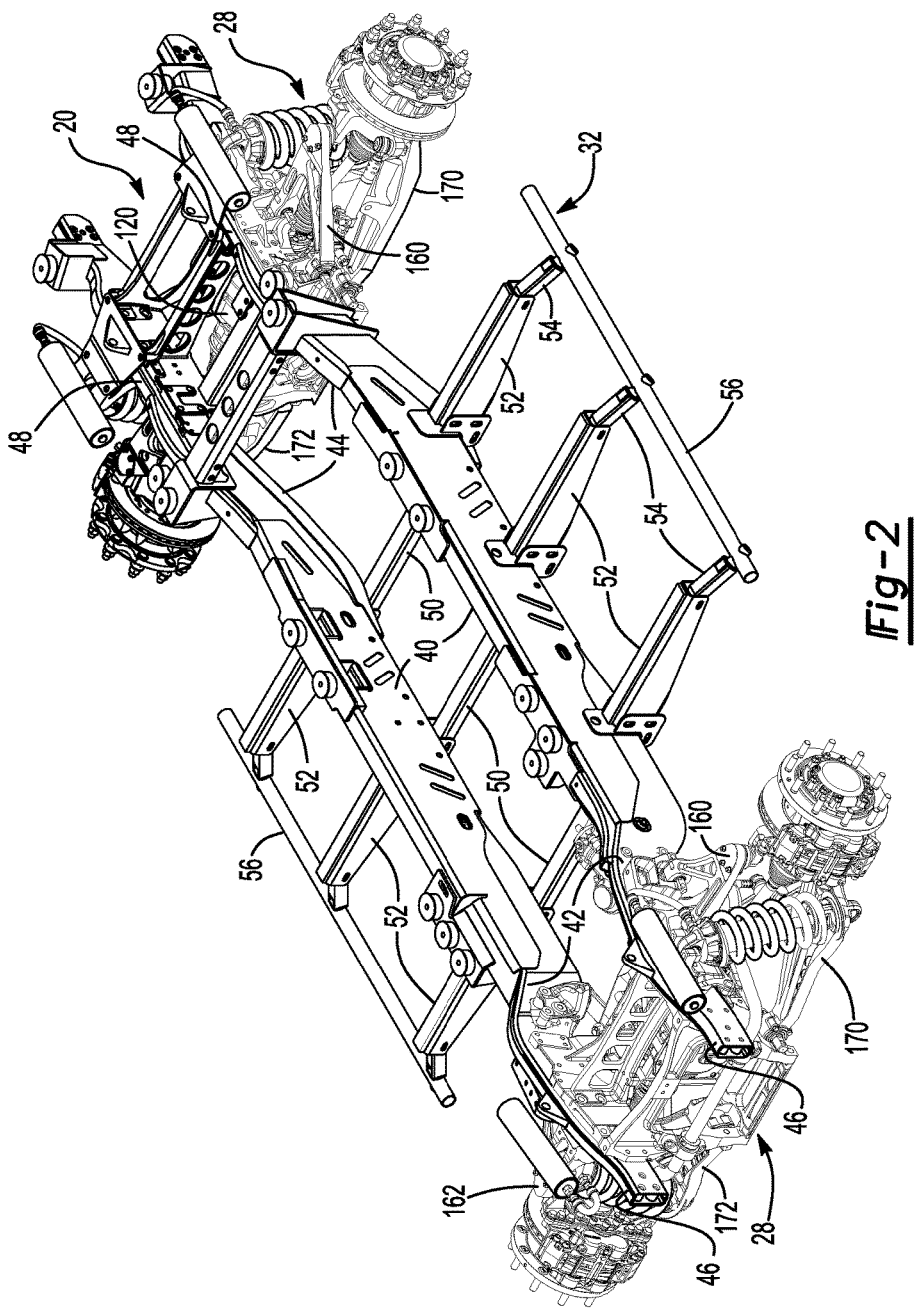
FIG. 2 is a perspective view of the vehicle chassis assembly of FIG. 1 in which a cab and braces are omitted for clarity.
Figure 3:
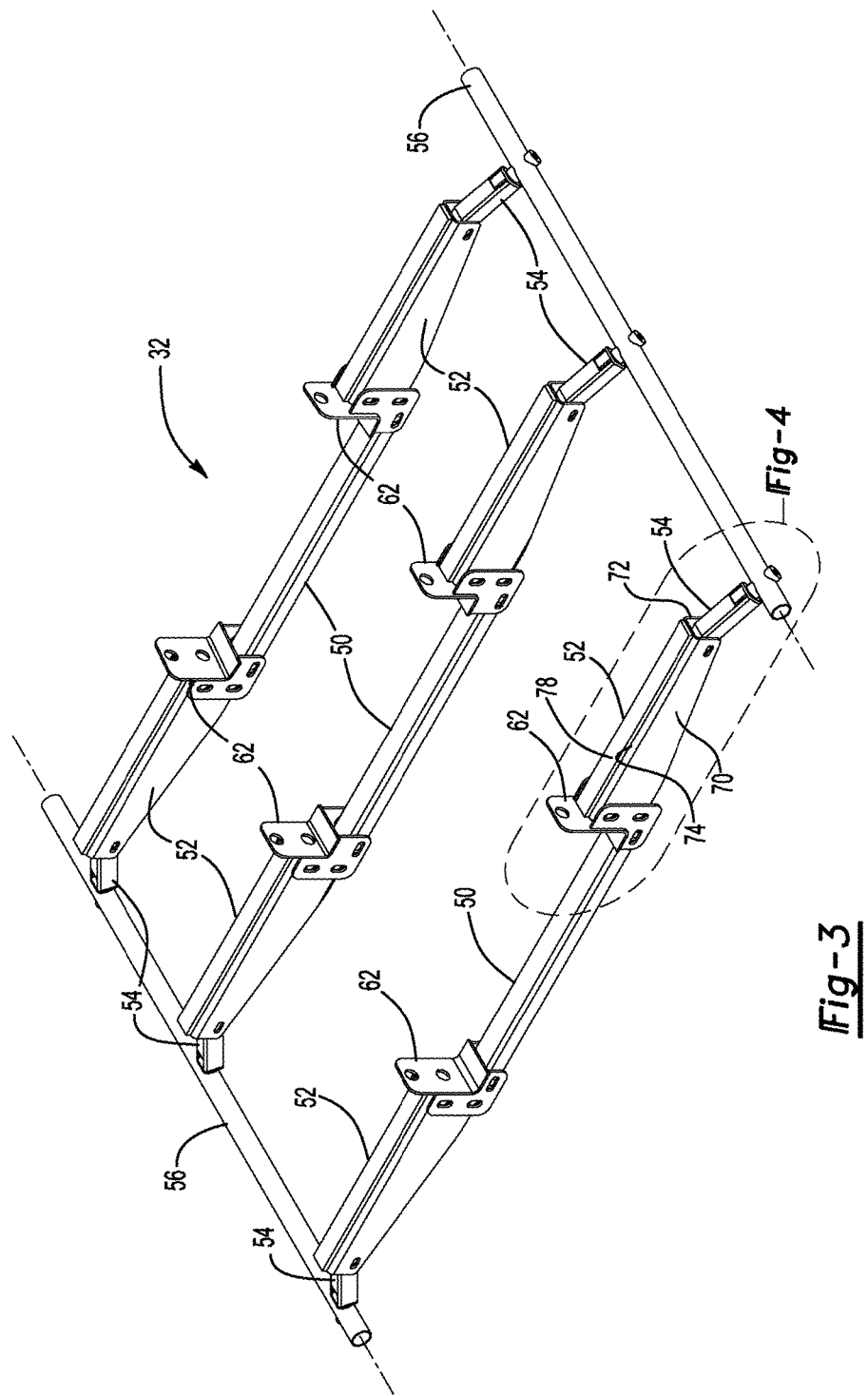
FIG. 3 is a perspective view of an outrigger subassembly that may be provided with the vehicle chassis assembly.

Referring to FIGS. 2 and 3, the outrigger subassembly 32 may be mounted to and may be disposed on the frame rails 30. For example, the outrigger subassembly 32 may be fixedly disposed on the center portion 40 of the frame rails 30. The outrigger subassembly 32 may be longitudinally positioned between the axle mounting modules 28 and may be configured to support the cab 22 of the vehicle. In at least one configuration, the outrigger subassembly may include a plurality of cross members 50, a plurality of outriggers 52, one or more linkages 54, and one or more downtubes 56.

Figure 4:
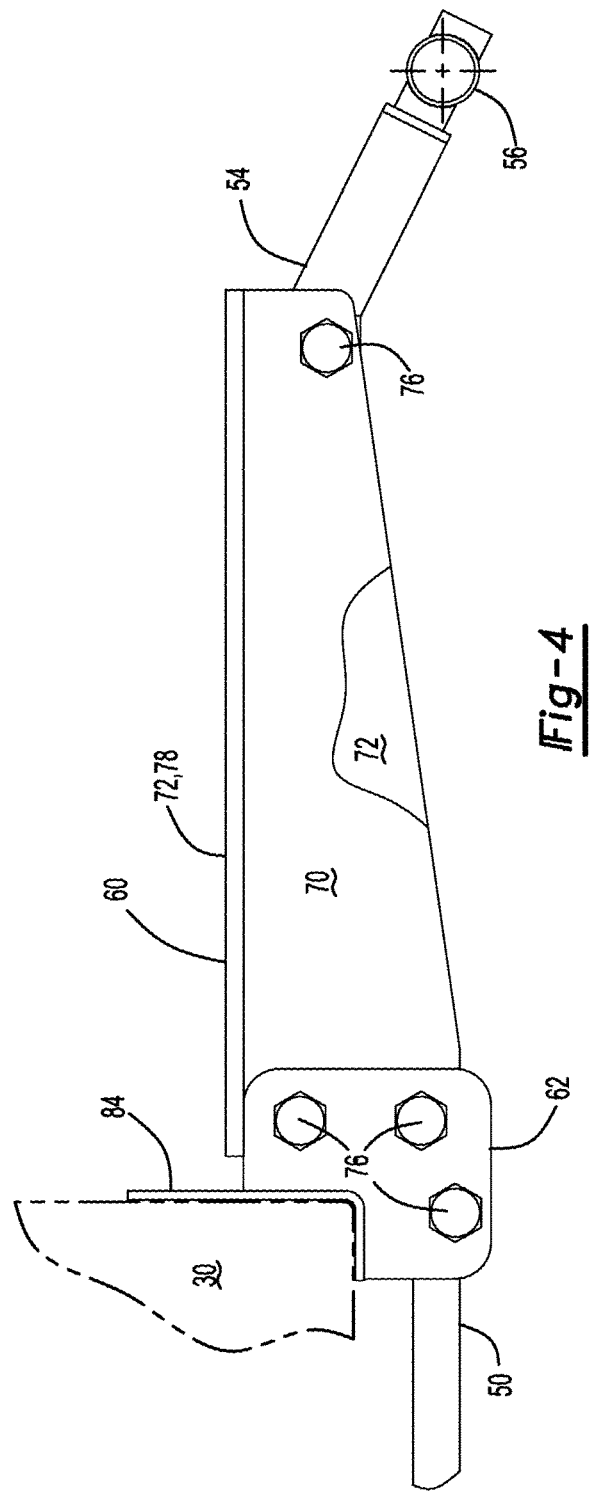
FIG. 4 is a side view of a portion of the outrigger subassembly of FIG. 3.

The cross members 50 may extend laterally with respect to the frame rails 30. As such, the cross members 50 may be disposed substantially perpendicular to the frame rails 30. The cross members 50 may be disposed proximate the center of the chassis 20 and may be generally located in the area between the frame rails 30. In at least one configuration, the cross members 50 may extend under the frame rails 30 and from an outrigger 52 that is mounted to the first frame rail 30 another outrigger 52 that is mounted to the second frame rail 30. In such a configuration, the cross member 50 may be coupled to and may engage both outriggers 52 and may optionally be spaced apart from and may not engage the frame rails 30 as is best shown in FIG. 4. It is also contemplated that the cross members 50 may be provided with the frame rails 30 and may engage the frame rails 30 and one or more configurations.

A plurality of outriggers 52 may extend laterally with respect to the frame rails 30. For example, a first set of outriggers 52 may extend laterally from the first frame rail 30 in a direction that extends away from the second frame rail 30, the cross members 50, or both. As such, the first set of outriggers 52 may extend from one frame rail 30 in a direction that extends away from the center of the chassis 20. A second set of outriggers 52 may be disposed opposite the first set of outriggers 52. The second set of outriggers 52 may extend laterally from the second frame rail 30 in a direction that extends away from the first frame rail 30, the cross members 50, or both. As such, the second set of outriggers 52 may extend from the other frame rail 30 in a direction that extends away from the center of the chassis 20 and away from the first set of outriggers 52. In at least one configuration, each outrigger 52 that extends from the first frame rail 30 may be aligned with or may be disposed in a common plane with an outrigger 52 that extends from the second frame rail 30 and a cross member 50.

Figure 5:
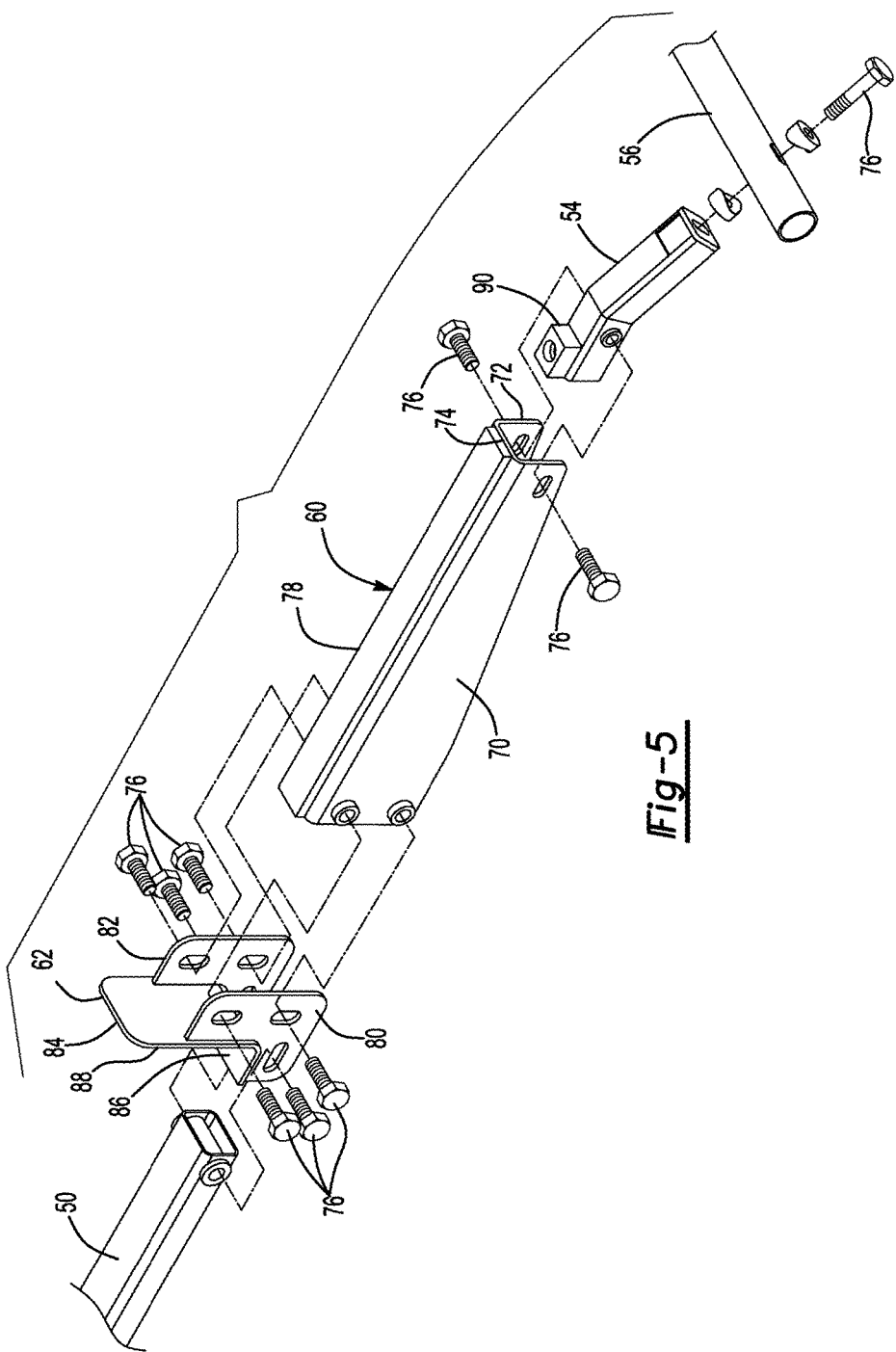
FIG. 5 is an exploded view of the portion of the outrigger subassembly shown in FIG. 3.

Referring to FIGS. 4 and 5, each outrigger 52 may include an outrigger arm 60 and an outrigger bracket 62.

The outrigger arm 60 may be configured as a channel that may extend between the outrigger bracket 62 and the linkage 54. For example, the outrigger bracket 62 may have a generally U-shaped cross-section that may include a first wall 70, a second wall 72, and a third wall 74. In at least one configuration, the first wall 70, the second wall 72, and the third wall 74 may be integrally formed such that the outrigger arm 60 is a unitary one-piece component.

The first wall 70 and the second wall 72 may extend from opposite ends of the third wall 74, may be spaced apart from each other, and may be disposed substantially parallel to each other. In addition, the first wall 70 and the second wall 72 may be tapered such that the height of the first wall 70 and the second wall 72 progressively decreases as the distance from the frame rail 30 or the outrigger bracket 62 increases. In at least one configuration, the first wall 70 and the second wall 72 may include a plurality of holes that may be aligned with each other and that may receive corresponding fasteners 76, such as bolts, that may couple the outrigger arm 60 to the outrigger bracket 62, the linkage 54, or both.

The third wall 74 may extend from the first wall 70 to the second wall 72. The third wall 74 may face toward the cab 22 and may define a top side 78 of the outrigger 52 that may support or engage the cab 22.

The outrigger bracket 62 may facilitate coupling of the outrigger arm 60 to a frame rail 30, a cross member 50, or both. In at least one configuration, the outrigger bracket 62 may have a generally L-shaped profile and may include a first bracket wall 80, a second bracket wall 82, and a connecting member 84. The first bracket wall 80, the second bracket wall 82, and the connecting member 84 may be integrally formed such that the outrigger bracket 62 is a unitary one-piece component.

The first bracket wall 80 and the second bracket wall 82 may extend from opposite ends of the connecting member 84, may be spaced apart from each other, and may be disposed substantially parallel to each other. In at least one configuration, the first bracket wall 80 and the second bracket wall 82 may include a plurality of holes or slots that may be aligned with each other and that may receive corresponding fasteners 76 to that may couple the cross member 50, the outrigger arm 60, or both, to the outrigger bracket 62. For example, the cross member 50 may be received between the first bracket wall 80 and the second bracket wall 82 and may optionally be spaced apart from the connecting member 84 as is best shown in FIG. 4. Similarly, the outrigger bracket 62 may be received between the first bracket wall 80 and the second bracket wall 82 and may extend away and may optionally be spaced apart from the connecting member 84.

The connecting member 84 may extend from the first bracket wall 80 to the second bracket wall 82. The connecting member 84 may have an L-shaped profile that may receive or cradle a frame rail 30. For instance, the connecting member 84 may have a first portion 86 and a second portion 88. The first portion 86 may extend under the frame rail 30 and may be disposed between the frame rail 30 and a cross member 50. The second portion 88 may extend along a lateral side of the frame rail 30 and may be disposed between the frame rail 30 and the outrigger arm 60. As such, the first portion 86 and the second portion 88 may separate the frame rail 30 from the cross member 50 in the outrigger arm 60.

Referring to FIGS. 1, 4 and 5, the linkage 54 may extend between the outrigger 52 and the downtube 56. In at least one configuration, the linkage 54 may extend from an end of the outrigger 52 that may be disposed opposite a corresponding frame rail 30. The linkage 54 may extend laterally from an end of the outrigger arm 60 in a direction that extends away from the outrigger bracket 62. In addition, the linkage 54 may extend at a downward angle or at an angle that extends away from the cab 22 and the top side 78 of the outrigger 52, which may help position the downtube 56 below the cab 22. In at least one configuration such as is shown in FIG. 5, linkage 54 may include a block 90 that may engage the third wall 74 of the outrigger arm 60 to inhibit downward rotation of the linkage 54 and downtube 56 with respect to the outrigger 52.

Referring to FIGS. 2-5, the downtube 56 may be coupled to one or more linkages 54. For example, the downtube 56 may be coupled to some or all of the linkages 54 that extend from a set of outriggers 52. In the configuration shown, a first downtube 56 is coupled to the linkages 54 that extend from the first set of outriggers 52 that extend from the first frame rail 30 and a second downtube 56 is coupled to the linkages 54 that extend from the second set of outriggers 52 that extend from the second frame rail 30. In at least one configuration, the first downtube 56 and the second downtube 56 may be disposed substantially parallel to each other and may extend along a downtube axis that may extend in a longitudinal direction, such as substantially parallel to the center portion 40 of a frame rail 30. As is best shown in FIG. 4, a downtube 56 may be positioned below the top side 78 of a corresponding outrigger 52 and may be disposed at least partially below a corresponding frame rail 30. The downtube 56 may be coupled to the linkages 54 in any suitable manner, such as with fasteners 76 like bolts, welding, or the like.

Referring to FIG. 1, the cab 22 may be a portion of the vehicle body structure in which the driver may sit. In at least one configuration, the cab 22 may include a plurality of walls that may extend around and may at least partially enclose the driver. These walls may include a front wall 100, a bottom wall 102, and a rear wall 104.

The front wall 100 may be disposed at the front of the cab 22. The front wall 100 may be generally disposed above the first gooseneck portion 42 of the frame rails 30. The front wall 100 may extend upwardly with respect to the frame rails 30 and may extend from the bottom wall 102.

The bottom wall 102 may be disposed at the bottom of the cab 22. The bottom wall 102 may be disposed on and may engage the chassis 20. For example, the bottom wall 102 may be disposed on and may engage the frame rails 30 and the outriggers 52 of the outrigger subassembly 32. The bottom wall 102 may extend longitudinally from the front wall 100 to the rear wall 104.

The rear wall 104 may be disposed at the rear of the cab 22. The rear wall 104 may be generally disposed above the second gooseneck portion 44 of the frame rails 30 and may extend upwardly with respect to the frame rails 30.

The cab 22 may be mounted to the frame rails 30 and may be supported by the outrigger subassembly 32. For example, the bottom wall 102 of the cab 22 may be supported by and may engage the outriggers 52 to help support the cab 22 and resist deflection of the cab 22. In various applications, such as military applications, the cab 22 may be an armored cab that may include armor or armored panels that may be provided along one or more walls of the cab 22. The addition of armor may increase the weight and the stiffness of the cab 22. As such, the armor may increase the load forces on the frame rails 30, which may increase load forces and deformation or compliance of various regions of the frame rails 30, such as the first gooseneck portion 42 and the second gooseneck portion 44. One or more braces, such as front braces 24, rear braces 26, or both may be provided with the vehicle chassis assembly 12 to help transfer load forces between the cab 22 and the frame rails 30 and reduce compliance or fatigue of the frame rails 30.

Referring to FIG. 1, one or more front braces 24 may be provided that may extend from a frame rail 30 to the cab 22. For example, a front brace 24 may extend from each frame rail 30 to the front wall 100 of the cab 22 to help inhibit compliance of the frame rail 30. The front brace 24 may be mounted to a first axle mounting portion 46 of a frame rail 30. For instance, one front brace 24 may be mounted to the first axle mounting portion 46 of a first frame rail 30 with a bracket 110 that may be mounted on the top of the first axle mounting portion 46 while another front brace 24 may be mounted to the first axle mounting portion 46 of the second frame rail 30 with another bracket 110 (shown in FIG. 2) that may be mounted on the top of the first axle mounting portion 46. In at least one configuration, the front brace 24 may be substantially linear and may be disposed in a nonparallel and non-perpendicular relationship with the first axle mounting portion 46 and the front wall 100. Mounting a front brace 24 to a first axle mounting portion 46 rather than the first gooseneck portion 42 may help stabilize and reduce fatigue of the first gooseneck portion 42.

One or more rear braces 26 may be provided that may extend from a frame rail 30 to the cab 22. For example, a rear brace 26 may extend from each frame rail 30 to the rear wall 104 of the cab 22 to help inhibit compliance of the frame rail 30. The rear brace 26 may be mounted to a second axle mounting portion 48 of a frame rail 30. For instance, one rear brace 26 may be mounted to the second axle mounting portion 48 of a first frame rail 30 with a bracket 110 that may be mounted on the top of the second axle mounting portion 48 while another rear brace 26 may be mounted to the second axle mounting portion 48 of the second frame rail 30 with another bracket 110 (shown in FIG. 2) that may be mounted on the top of the second axle mounting portion 48. In at least one configuration, the rear brace 26 may be substantially linear and may be disposed in a nonparallel and non-perpendicular relationship with the second axle mounting portion 48 and the rear wall 104. Mounting a rear brace 26 to a second axle mounting portion 48 rather than the second gooseneck portion 44 may help stabilize and reduce fatigue of the second gooseneck portion 44. The rear braces 26 may be longer or have a longer axial length than the front braces 24 in one or more embodiments.

Referring to FIGS. 1 and 2, one or more axle mounting modules 28 may be mounted to the chassis 20. The axle mounting module 28 may interconnect an axle assembly 120, such as a drive axle assembly, to the chassis 20. In at least one configuration, such as is shown in FIGS. 6-9, the axle mounting module 28 may include a subframe 130, a skid plate 132, and one or more mounting plates 134.

Figure 6:
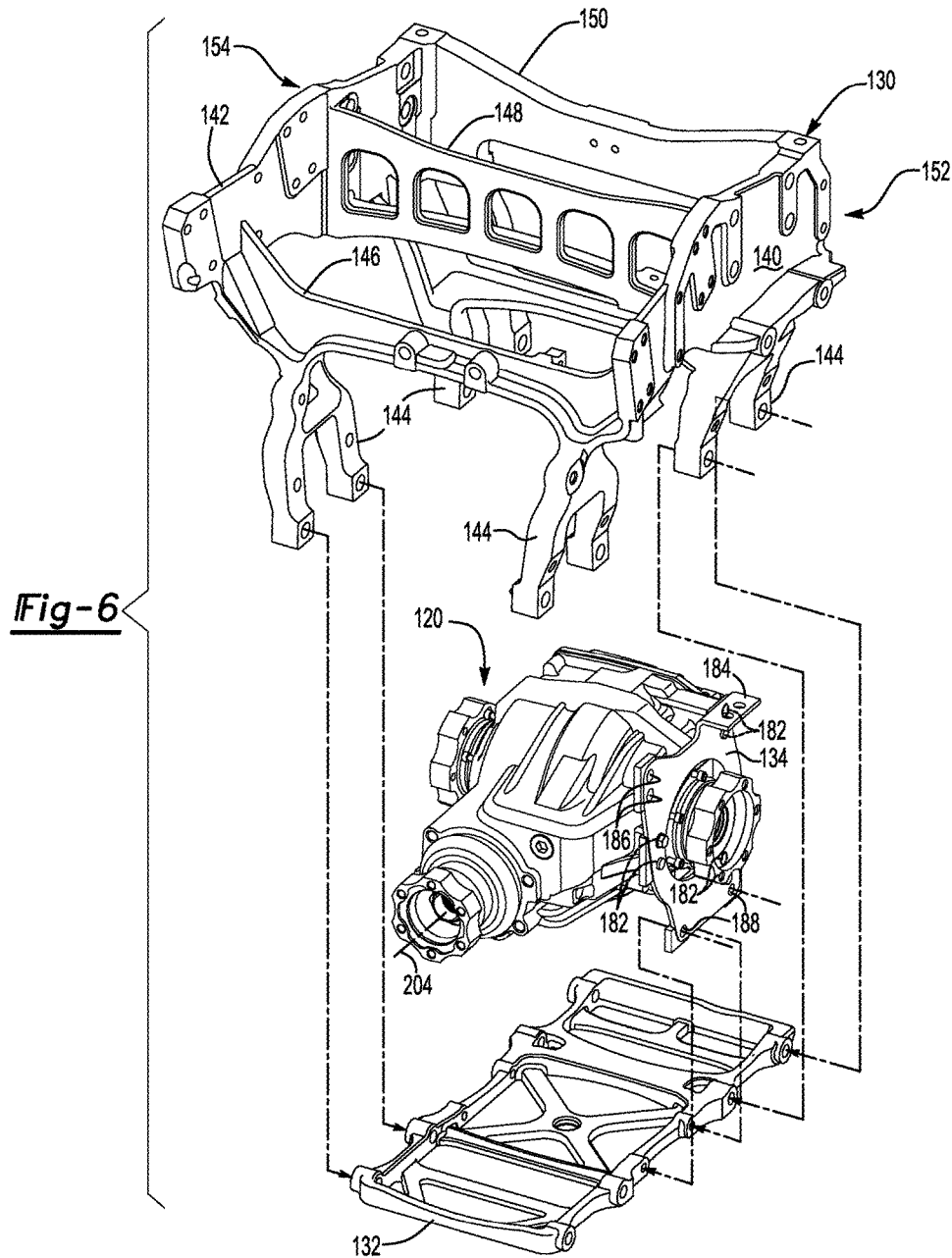
FIG. 6 is an exploded view of a portion of the vehicle chassis assembly showing a subframe, a skid plate, a mounting plate, and an axle assembly.

Referring to FIGS. 2 and 6, the subframe 130 may facilitate mounting of the axle assembly 120 to the frame rails 30. For instance, a subframe 130 may be disposed between the frame rails 30 adjacent to the first axle mounting portions 46 or the second axle mounting portions 48 and may be fixedly attached to the frame rails 30. In addition, the subframe 130 may support a suspension module that may dampen vibrations associated with vehicle travel, produce a desired level of ride quality, control vehicle height, or combinations thereof. In at least one configuration, the subframe may include a first side member 140, a second side member 142, a plurality of downward extending arms 144, a first subframe cross member 146, a second subframe cross member 148, and a third subframe cross member 150.

The first side member 140 may be disposed along a first lateral side 152 of the subframe 130. The first side member 140 may be disposed proximate and may engage a frame rail 30. For instance, the first side member 140 may be fastened to a first axle mounting portion 46 or a second axle mounting portion 48 of the first frame rail 30 in any suitable manner, such as with one or more fasteners like bolts. A first upper control arm 160 may be mounted to the first side member 140.

The second side member 142 may be disposed along a second lateral side 154 of the subframe 130. As such, the second side member 142 may be disposed opposite and may be spaced apart from the first side member 140. The second side member 142 may be disposed proximate and may engage another frame rail 30. For instance, the second side member 142 may be fastened to a first axle mounting portion 46 or a second axle mounting portion 48 of the second frame rail 30 in any suitable manner, such as with one or more fasteners like bolts. A second upper control arm 162 may be mounted to the second side member 142.

A plurality of downward extending arms 144 may be provided with the subframe 130. In the configuration shown, four downward extending arms 144 are provided. For example, first and second downward extending arms may be disposed along a first lateral side 152 of the subframe 130 and may extend from the first side member 140 while third and fourth downward extending arms may be disposed along a second lateral side 154 of the subframe 130 and may extend from the second side member 142. A first lower control arm 170 may be mounted to the first and second downward extending arms. A second lower control arm 172 may be mounted to the third and fourth downward extending arms. The fasteners that mount the first and second lower control arms 170, 172 may also extend to the skid plate 132 to mount the skid plate 132 to the subframe 130.

Figure 7:
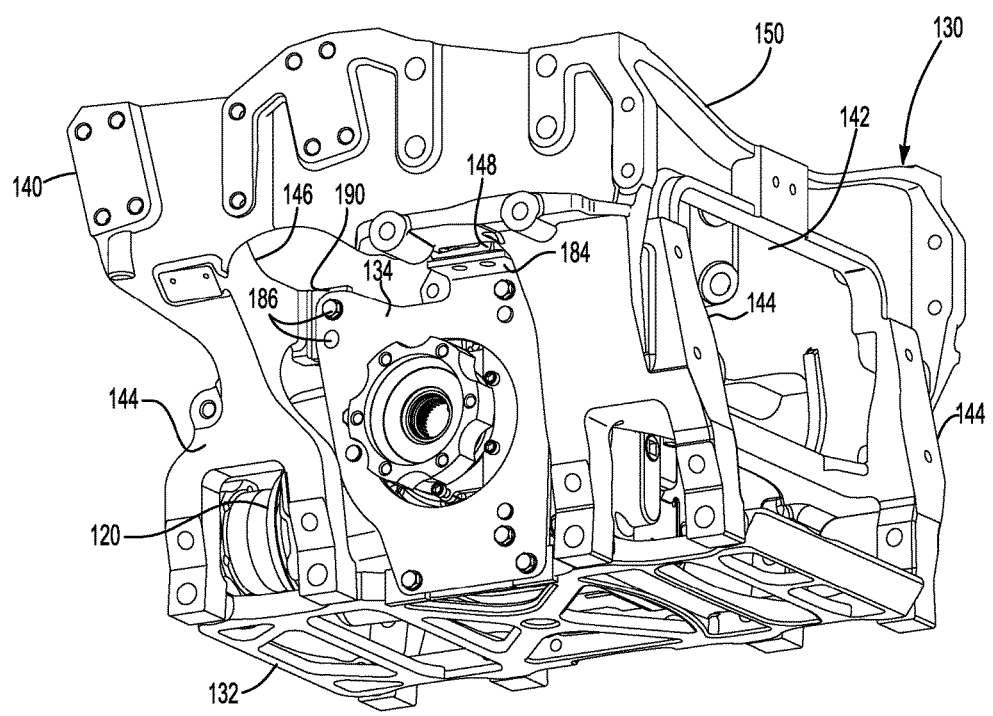
FIG. 7 is an assembled perspective view of the portion of the vehicle chassis assembly shown in FIG. 6.

Referring to FIGS. 6 and 7, the first subframe cross member 146 may extend between the first side member 140 and the second side member 142 or between the first downward extending arm 144 that extends from the first side member 140 and the third downward extending arm 144 that is disposed opposite the first downward extending arm 144 and extends from the second side member 142. As is best shown in FIG. 7, the first subframe cross member 146 may include a mounting boss 190 which the mounting plate 134 may be attached. The mounting boss 190 may be disposed on a side of the first subframe cross member 146 that may face toward the second subframe cross member 148 and may extend or protrude toward the second subframe cross member 148.

The second subframe cross member 148 may extend generally parallel to and may be spaced apart from the first subframe cross member 146. The second subframe cross member 148 may extend laterally between the first side member 140 and the second side member 142. In addition, the second subframe cross member 148 may be longitudinally positioned between the first subframe cross member 146 and the third subframe cross member 150. As such, the second subframe cross member 148 may be longitudinally positioned between the first and second downward extending arms 144, 144 and between the second and third downward extending arms 144, 144. In at least one configuration, the mounting plate 134 may be attached to the second subframe cross member 148. For instance, the mounting plate 134 may be attached to a bottom surface of the second subframe cross member 148 in one or more embodiments. The second subframe cross member 148 may have a different configuration than the first subframe cross member 146. For instance, the second subframe cross member 148 may extend further toward the top of the subframe 130 than the first subframe cross member 146.

The third subframe cross member 150 may extend generally parallel to and may be spaced apart from the first subframe cross member 146 and the second subframe cross member 148. The third subframe cross member 150 may extend laterally between the first side member 140 and the second side member 142 or between the second downward extending arm 144 that extends from the first side member 140 and the fourth downward extending arm 144 that is disposed opposite the second downward extending arm 144 and extends from the second side member 142. The third subframe cross member 150 may have a different configuration than the first subframe cross member 146 and the second subframe cross member 148. For instance, the third subframe cross member 150 may have a thicker configuration or may be provided with fewer voids or openings than the other cross members to help withstand load forces since the third subframe cross member 150 may be positioned near or at an end of the vehicle or bumper of the vehicle.

The skid plate 132 may be disposed at the bottom of the subframe 130. The skid plate 132 may be provided to prevent impact damage to the axle assembly 120 or other components that may be received in the subframe 130, such as a motor, gearbox, or the like. The skid plate 132 may be disposed between the downward extending arms 144. In addition, the skid plate 132 may be attached to the downward extending arms 144, such as with one or more fasteners such as bolts. The skid plate 132 may be disposed below the axle assembly 120. In addition, the axle assembly 120 may be spaced apart from the subframe 130, the skid plate 132, or both.

Referring to FIGS. 6-9, one or more mounting plates 134 may be provided to couple the axle assembly 120 to the subframe 130, the skid plate 132, or both. As such, a mounting plate 134 may be fixedly mounted to the axle assembly 120 and the mounting plate 134 may be fixedly mounted to the subframe 130 and/or the skid plate 132. The mounting plate 134 may be generally positioned between a pair of downward extending arms 144 that may be disposed along a common lateral side of the subframe 130. In at least one configuration, the mounting plate 134 may include an opening 180, one or more sets of axle assembly mounting features 182, an upper flange 184, one or more first cross member mounting features 186, and one or more skid plate mounting features 188.

Figure 8:
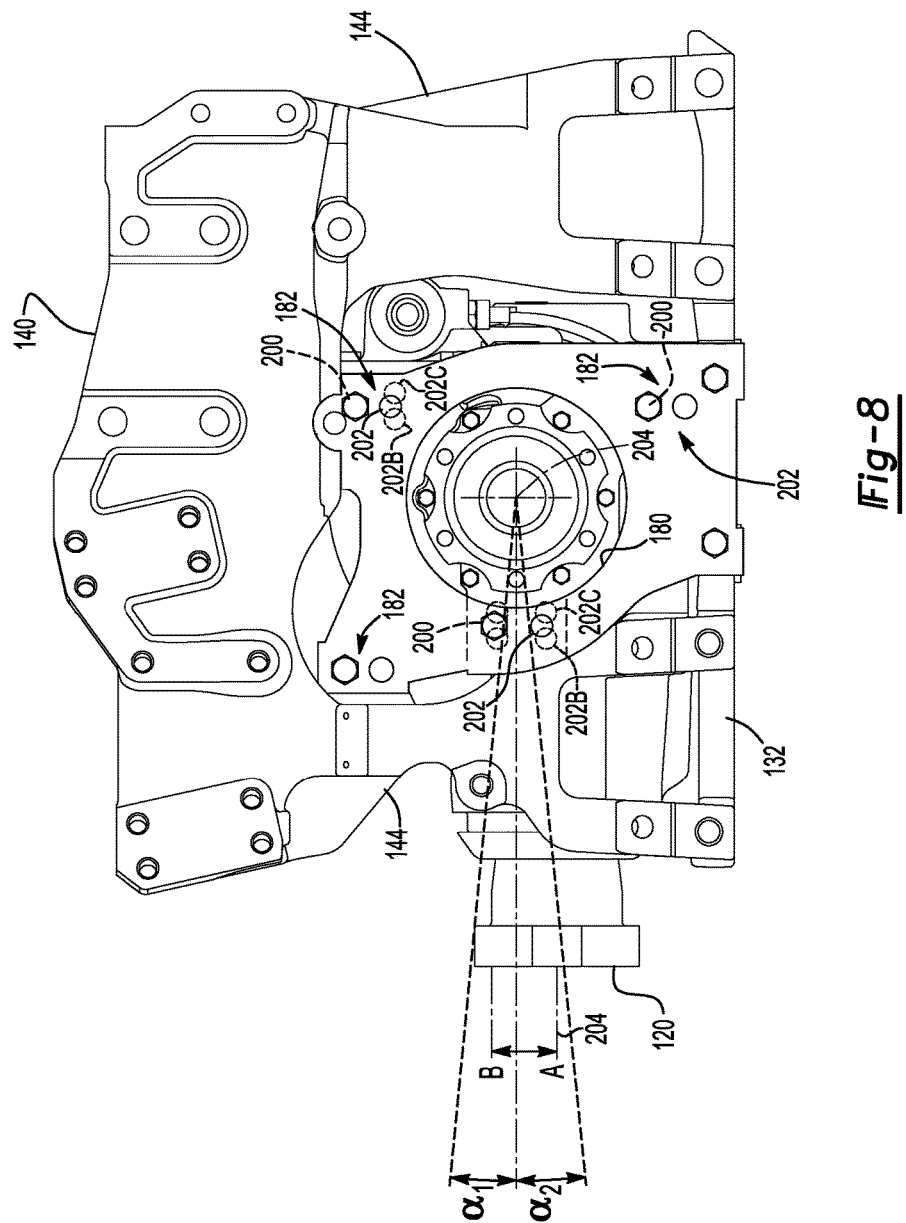
FIG. 8 is a lateral side view of the portion of the vehicle chassis assembly shown in FIG. 7.

Referring to FIG. 8, the opening 180 may be defined by the mounting plate 134. For example, the opening 180 may be a through hole that may be completely defined by the mounting plate 134. A portion of the axle assembly 120, and axle shaft, or both may extend through the opening 180.

Referring to FIG. 6, one or more sets of axle assembly mounting features 182 may be provided with the mounting plate 134. In at least one configuration, the axle assembly mounting features 182 may be through holes that may receive a fastener, such as a bolt, that may couple the mounting plate 134 to the housing of the axle assembly 120. Referring to FIG. 8, multiple sets of axle assembly mounting features 182 are shown. In the configuration shown, each set of axle assembly mounting features 182 includes holes clustered at three locations. Each cluster has at least one upper hole (designated with reference number 200) and at least one lower hole (designated with reference number 202) that may be positioned below a corresponding upper hole. The upper holes and lower holes may allow the axle assembly 120 to be mounted at different vertical positions. The upper holes and lower holes may further be provided at different locations (such as is designated with reference numbers 202B and 202C) to allow the axle assembly 120 to be mounted at different angular positions.

Referring to FIG. 8, the multiple sets of axle mounting features may allow the axle assembly 120 to be mounted at different vertical positions with respect to the subframe 130 and the skid plate 132. For instance, the centerline or input axis 204 of the input of the axle assembly 120 may be positioned at level A when the upper axle mounting features 200 are used to couple the mounting plate 134 to the axle assembly 120, while the centerline or input axis 204 of the axle assembly 120 may be positioned at level B when the lower axle mounting features 202 are used to couple the mounting plate 134 to the axle assembly 120. Thus, the sets of axle mounting features may allow the axle assembly 120 to be mounted to the mounting plate 134, and hence to the subframe 130 at different vertical positions.

The first and second sets of axle mounting features may also allow the axle assembly 120 to be assembled to the subframe 130 at different angular positions when viewed from a lateral side of the chassis 20. As such, the sets of axle mounting features may allow the axle assembly 120 and its input shaft or input drive pinion to be rotated or tilted up or down with respect to a nominal position or nominal plane, such as a horizontal plane. For illustration purposes in FIG. 8, representative locations for alternate positions of the lower axle mounting features 202 are shown with dashed lines that facilitate tilting of the axle assembly 120. For instance, the mounting plate 134 may be fastened to the axle assembly 120 using axle mounting features 202B to tilt the input axis 204 upward by angle α1 with respect to a nominal position like a horizontal plane. Alternatively, the mounting plate 134 may be fastened to the axle assembly 120 using axle mounting features 202C to tilt the input axis 204 downward by angle α2. Alternate positions for the upper axle mounting features 200 are not shown in FIG. 8 for clarity; however, it is to be understood that the same or similar alternate positions may be provided with the first set of axle mounting features 200 in one or more embodiments.

Figure 9:
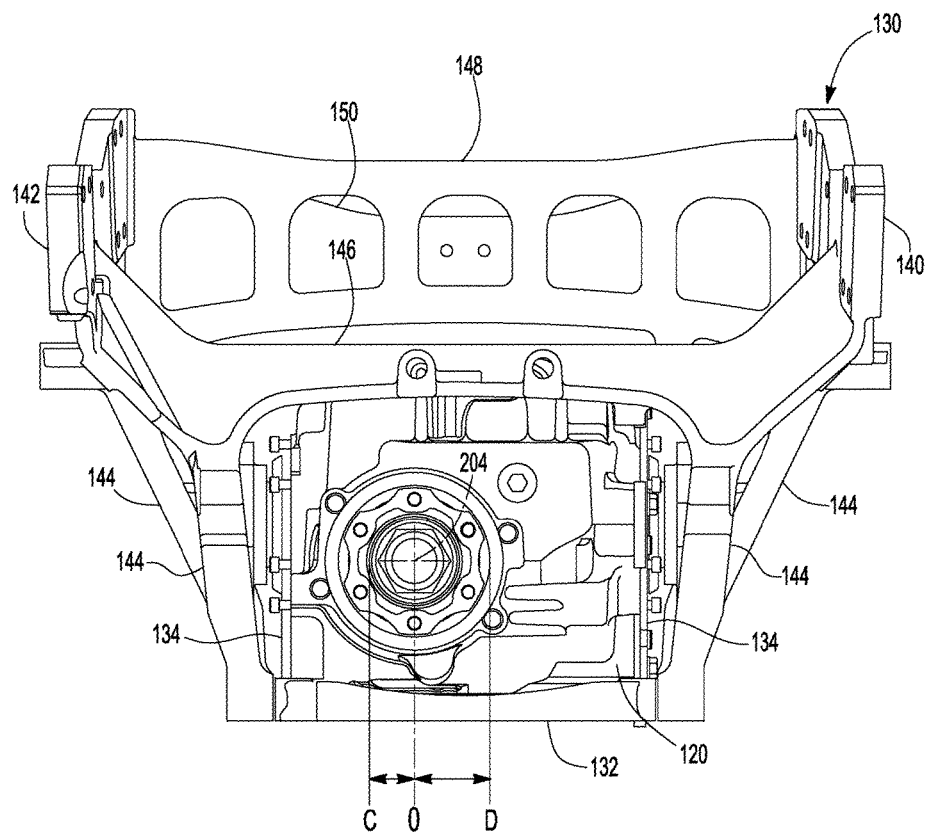
FIG. 9 is rear side view of the portion of the chassis assembly shown in FIG. 7.

Referring to FIG. 9, the mounting plates 134 may also allow the lateral position of the axle assembly 120 to be adjusted with respect to the subframe 130. In FIG. 9, the input axis 204 is located at a nominal lateral position designated position 0. The axle assembly 120 may be positioned further left, such as to position C, by modifying the mounting plate 134. For example, the axle assembly 120 may be positioned further left by reducing the thickness of the left mounting plate 134, if provided, and increasing the thickness of the right mounting plate 134, by removing a spacer from between the left mounting plate 134 and the axle assembly 120 and adding a spacer between the right mounting plate 134 and the axle assembly 120, or by bending one or both mounting plates 134, such as by bending or moving a portions of the left mounting plate 134 and the right mounting plate 134 to which the axle assembly 120 is attached further to the left. The axle assembly 120 may be positioned further right, such as to position D, by modifying the mounting plate 134. For example, the axle assembly 120 may be positioned further right by increasing the thickness of the left mounting plate 134, if provided, and decreasing the thickness of the right mounting plate 134, by removing a spacer from between the right mounting plate 134 and the axle assembly 120 and adding a spacer between the left mounting plate 134 and the axle assembly 120, or by bending one or both mounting plates 134, such as by bending or moving a portions of the left mounting plate 134 and the right mounting plate 134 to which the axle assembly 120 is attached further to the right.

Referring to FIG. 7, the upper flange 184 may be located at or near the top of the mounting plate 134. In at least one configuration, the upper flange 184 may extend substantially perpendicular to an adjacent portion of the mounting plate 134 and may extend in a lateral direction that extends away from the axle assembly 120. The upper flange 184 may couple the mounting plate 134 to the second subframe cross member 148. For instance, one or more fasteners, such as bolts, may extend through holes in the upper flange 184 and may be received in corresponding holes in the second subframe cross member 148 to couple the mounting plate 134 to the second subframe cross member 148.

Referring to FIGS. 6 and 7, one or more first cross member mounting features 186 may also be provided to facilitate coupling of the mounting plate 134 to the first subframe cross member 146. In at least one configuration, the first cross member mounting features 186 may be disposed near the top of the mounting plate 134 and may be disposed near a side of the mounting plate 134 that may be disposed adjacent to the first subframe cross member 146. In at least one configuration, the first cross member mounting features 186 may be configured as one or more holes that may extend through the mounting plate 134. One or more fasteners, such as bolts, may extend through the first cross member mounting features 186 and may be received in corresponding holes in the first subframe cross member 146 to couple the mounting plate 134 to the first subframe cross member 146.

One or more skid plate mounting features 188 may be provided to facilitate coupling of the mounting plate 134 to the skid plate 132. In at least one configuration, the skid plate mounting features 188 may be disposed near the bottom of the mounting plate 134 and may be positioned between downward extending arms 144 that may be disposed along a common lateral side of the subframe 130. For instance, the skid plate mounting features 188 may be disposed between the first and second downward extending arms 144, 144, between the third and fourth downward extending arms 144, 144, or both. One or more fasteners, such as bolts, may extend through the skid plate mounting features 188 and may be received in corresponding holes in the skid plate 132 to couple the mounting plate 134 to the skid plate 132.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle chassis assembly comprising:
   first and second frame rails; and
   an outrigger subassembly that is disposed on the first and second frame rails and is configured to support a cab of a vehicle, the outrigger subassembly including:
      a first outrigger that extends from the first frame rail in a direction that extends away from the second frame rail, the first outrigger having a top side that supports the cab;
      a linkage that extends from an end of the first outrigger; and
      a downtube that is coupled to the linkage.

2. The vehicle chassis assembly of claim 1 wherein the cab is an armored cab.

3. The vehicle chassis assembly of claim 1 further comprising a second outrigger that extends from the first frame rail in a direction that extends away from the second frame rail and is spaced apart from the first frame rail, wherein the second outrigger has a linkage that extends from an end of the second outrigger, wherein the downtube is coupled to the linkage of the first outrigger and the linkage of the second outrigger.

4. The vehicle chassis assembly of claim 1 wherein the outrigger subassembly includes a third outrigger that extends from the second frame rail in a direction that extends away from the first frame rail.

5. The vehicle chassis assembly of claim 4 further comprising a cross member that extends from the first outrigger to the third outrigger and that extends under the first frame rail and the second frame rail.

6. The vehicle chassis assembly of claim 5 wherein the downtube is positioned below the top side of the first outrigger and at least partially below the first frame rail.

7. The vehicle chassis assembly of claim 5 wherein the first outrigger includes an outrigger arm and an outrigger bracket that receives the outrigger arm and the cross member.

8. The vehicle chassis assembly of claim 7 wherein the outrigger bracket has an L-shaped profile that receives the first frame rail and separates the first frame rail from the outrigger arm and the cross member.

9. The vehicle chassis assembly of claim 1 further comprising a front brace that extends from the first frame rail to a front wall of the cab to inhibit compliance of the first frame rail.

10. The vehicle chassis assembly of claim 9 wherein the first frame rail has a center portion from which the outrigger subassembly extends, a first gooseneck portion that extends upward from a first end of the center portion, and first axle mounting portion that extends from an end of the first gooseneck portion, wherein the front brace is mounted to the first axle mounting portion.

11. The vehicle chassis assembly of claim 10 further comprising a rear brace that extends from the first frame rail to a rear wall of the cab to inhibit compliance of the first frame rail.

12. The vehicle chassis assembly of claim 11 wherein the first frame rail has a second gooseneck portion that extends upward from a second end of the center portion and second axle mounting portion that extends from an end of the second gooseneck portion, wherein the rear brace is mounted to second axle mounting portion.

13. The vehicle chassis assembly of claim 12 wherein the front brace is mounted to a top of the first axle mounting portion and the rear brace is mounted to a top of the second axle mounting portion.

14. The vehicle chassis assembly of claim 12 wherein the rear brace is longer than the front brace.

15. A vehicle chassis assembly comprising:
first and second frame rails;
a subframe that is fixedly disposed on the first and second frame rails, the subframe having first and second downward extending arms disposed along a first lateral side of the subframe;
a skid plate that is fixedly disposed on the first and second downward extending arms;
a mounting plate that is fixedly mounted to the subframe and to the skid plate; and
an axle assembly that is fixedly mounted to the mounting plate.

16. The vehicle chassis assembly of claim 15 wherein the axle assembly is spaced apart from the skid plate and the subframe and the mounting plate is coupled to the skid plate between the first and second downward extending arms.

17. The vehicle chassis assembly of claim 16 wherein the mounting plate has an opening through which the axle assembly extends.

18. The vehicle chassis assembly of claim 17 wherein the subframe has third and fourth downward extending arms disposed along a second lateral side of the subframe and a first subframe cross member that extends from the first downward extending arm to the third downward extending arm, wherein the mounting plate is fixedly coupled to the first subframe cross member.

19. The vehicle chassis assembly of claim 18 wherein the subframe has a second subframe cross member that extends between the first lateral side and the second lateral side of the subframe and the mounting plate has an upper flange that extends away from the axle assembly and is disposed proximate a top of the mounting plate, wherein the upper flange is coupled to the second subframe cross member.

20. The vehicle chassis assembly of claim 19 wherein the subframe has a third subframe cross member that extends from the second downward extending arm to the fourth downward extending arm, wherein the second subframe cross member is disposed between the first subframe cross member and the third subframe cross member.

* * * * *

UNITED STATES PATENT AND TRADEMARK OFFICE
CERTIFICATE OF CORRECTION

PATENT NO. : 10,501,123 B2
APPLICATION NO. : 15/862735
DATED : December 10, 2019
INVENTOR(S) : Kevin Svacha et al.

It is certified that error appears in the above-identified patent and that said Letters Patent is hereby corrected as shown below:

In the Claims

Column 11, Line 30, Claim 12:
After "center portion and"
Insert -- a --.

Column 11, Lines 32-33, Claim 12:
After "brace is mounted to"
Insert -- the --.

Signed and Sealed this
Seventh Day of April, 2020

Andrei Iancu
*Director of the United States Patent and Trademark Office*